(12) United States Patent
Metten et al.

(10) Patent No.: US 10,570,942 B2
(45) Date of Patent: Feb. 25, 2020

(54) ANNULAR PLUG COUPLING, AND PRODUCTION METHOD AND CONNECTION METHOD THEREFOR

(71) Applicant: BÖLLHOFF VERBINDUNGSTECHNIK GMBH, Bielefeld (DE)

(72) Inventors: Andreas Metten, Versmold (DE); Jasmin Fritzsch, Halle (DE)

(73) Assignee: Böllhoff Verbindungstechnik GmbH, Bielefeld (DE)

( * ) Notice: Subject to any disclaimer, the term of this patent is extended or adjusted under 35 U.S.C. 154(b) by 733 days.

(21) Appl. No.: 15/107,543

(22) PCT Filed: Dec. 23, 2014

(86) PCT No.: PCT/EP2014/079165
§ 371 (c)(1),
(2) Date: Jun. 23, 2016

(87) PCT Pub. No.: WO2015/097222
PCT Pub. Date: Jul. 2, 2015

(65) Prior Publication Data
US 2016/0319856 A1    Nov. 3, 2016

(30) Foreign Application Priority Data
Dec. 23, 2013    (DE) .................. 20 2013 011 533 U (51) Int. Cl.
*F16B 21/07*    (2006.01)
*F16C 11/06*    (2006.01)

(52) U.S. Cl.
CPC ........ *F16B 21/076* (2013.01); *F16C 11/0657* (2013.01)

(58) Field of Classification Search
CPC ................. F16B 21/075; F16B 21/076; Y10T 403/32713; Y10T 403/32721;
(Continued)

(56) References Cited

U.S. PATENT DOCUMENTS 5,580,204 A * 12/1996 Hultman ................. F16B 5/065
24/297
6,206,604 B1 * 3/2001 Dembowsky ......... F16B 21/075
403/122

(Continued)

FOREIGN PATENT DOCUMENTS

DE    4334926 A1    4/1995
DE    20216836 U1    2/2003
(Continued)

OTHER PUBLICATIONS

English translation of the International Preliminary Report on Patentability for PCT/EP2014/079165 dated Jul. 7, 2016, 8 pages.

(Continued)

*Primary Examiner* — Jonathan P Mansinick
(74) *Attorney, Agent, or Firm* — Reising Ethington P.C.

(57) ABSTRACT

An annular plug coupling which can be fastened within an opening in a first component and has the following features: a central coupling seat, in particular a ball socket, to which a coupling head of a second part can be releasably connected, and an intermediate ring that includes a plurality of curved, radially inward-extending first spring elements connected to the ball socket, and a plurality of curved, radially outward-extending second spring elements which are provided with a locking connection at a radially outward end such that the plug coupling can be locked within the opening in the component.

17 Claims, 7 Drawing Sheets

(58) Field of Classification Search
CPC ..... Y10T 403/32737; Y10T 403/32861; Y10T 403/32868; Y10T 24/309; Y10T 24/44026; F16C 11/0657
USPC .............................. 403/50, 51, 132, 133, 135
See application file for complete search history.

(56) References Cited

U.S. PATENT DOCUMENTS

| | | | |
|---|---|---|---|
| 6,276,652 B1 | 8/2001 | Rieger | |
| 7,004,665 B2* | 2/2006 | Wasylewski | ........ F16C 11/0638 403/122 |
| 7,044,018 B2* | 5/2006 | Sanchez | ................. F16C 1/108 403/135 |
| 7,056,125 B2* | 6/2006 | Melis | ....................... F16C 1/12 403/133 |
| 7,168,879 B2 | 1/2007 | Bertram et al. | |
| 2004/0049894 A1* | 3/2004 | Jackson, Jr. | ........ B60R 13/0206 24/293 |
| 2004/0086324 A1* | 5/2004 | Bertram | ................ F16B 21/073 403/133 |
| 2008/0118302 A1* | 5/2008 | Sussenbach | .......... F16B 21/075 403/227 |

FOREIGN PATENT DOCUMENTS

| | | | | |
|---|---|---|---|---|
| DE | 202006017798 U1 | | 2/2007 | |
| DE | 102007031320 A1 | | 1/2009 | |
| DE | 102007041537 A1 | | 3/2009 | |
| DE | 102013102197 A1 * | | 9/2013 | ............ F16C 11/069 |
| EP | 0590317 A2 | | 4/1994 | |
| EP | 1850017 A2 | | 10/2007 | |
| EP | 3064790 A1 * | | 9/2016 | ............ F16B 21/075 |
| JP | S62297525 | | 12/1987 | |
| WO | WO9913231 A1 | | 3/1999 | |

OTHER PUBLICATIONS

Written Opinion & International Search Report for PCT/EP2014/079165 dated Apr. 7, 2015, 9 pages.

* cited by examiner

ANNULAR PLUG COUPLING, AND PRODUCTION METHOD AND CONNECTION METHOD THEREFOR

1. TECHNICAL FIELD

The present disclosure relates to an annular plug coupling which can be fastened in a component opening of a first component, as well as a production method and a connection method for this plug coupling.

2. BACKGROUND

In the prior art different couplings are known which consist of a receiving or female coupling part and a bolt having a connecting head, for example a ball head. These plug couplings are mostly cap-shaped which can be perceived from U.S. Pat. No. 5,580,204. On the one hand this cap releasably incorporates a ball head of a ball bolt or stud and on the other hand, axially pierced sidewalls at the same time serve as means for resilient mounting of the ball head and the coupling part in a component opening of a component. This segmentation of the sidewalls of the cap-shaped plug coupling only provides a limited strength when the ball head is strained by a combined tensile and transverse force. This load opens at least partially the entrance of the coupling part, so that the received ball head can easily disengage.

In DE 43 34 926 a central locking coupling is resiliently arranged in a ring. This permits a damping of transverse forces. The surrounding retaining or holding ring in turn is mounted centrally, which due to the segmented or pierced coupling wall, results in a failure likely concentration of mechanical tensions for adversely loaded wall segments.

DE 10 2007 031 320 A1 and WO 99/13231 also describe cap-shaped coupling parts with different exterior shape. In principle, they are fastened in the same way in a component opening and loaded disadvantageously as it has been described above in connection with the plug coupling according to U.S. Pat. No. 5,580,204. Therefore, here also no reliable hold or support of the coupling head is realizable especially at combined transverse and tensile loads.

DE 202 16 836 U1 describes a cap-shaped coupling part which can only be installed in a laterally open receiving opening of a component. While a circumferential ring is supported completely on the component, a ball socket is centrally held in this ring. For this purpose, the ball socket has a peripherally closed collar which comprises damping wrinkles in radial direction and with which the ring is circumferentially connected. In addition to the great design height due to the cap shape of the plug coupling, the circumferential collar only allows a limited damping of radial vibrations. Axial compensation or damping movements are also only possible to a limited extent, because here, the shape of the closed circumferential collar as well as the material choice of the ball socket, which is necessary for holding the ball head, become negatively noticeable. In addition, the mounting of the cap-shaped coupling part requires an adapted socket with disadvantageous space requirement and certain production expenditure.

It is therefore the object of at least certain implementations of the present invention to provide a space-saving and easily installable plug coupling the damping and/or tolerance compensation behavior of which is constructively adaptable.

3. SUMMARY

The above mentioned object may be solved by an annular plug coupling. Furthermore, the present invention discloses a production method for this annular plug coupling and a connection method for a first and a second component by means of the annular plug coupling to solve the above mentioned object. Further developments and advantageous embodiments result from the following description, the accompanying drawings and the appending claims.

The inventive annular plug coupling can be fastened in a component opening of a first component. The plug coupling also has the following features: a centrally arranged coupling seat or coupler pocket, particularly a ball socket by means of which a coupling head of a second component is detachably connectable, and an intermediate ring with a plurality of curvilinear and radially inwardly extending first spring elements, which are connected with the ball socket, and a plurality of curvilinear and radially outwardly extending second spring elements having a locking connection at a radially outward end, so that the plug coupling can be locked into the component opening.

The inventive plug coupling uses an intermediate ring in the radial interior of which the coupling seat for receiving the coupling head of the second component is arranged. Based on this arrangement, the inventive plug coupling has a low overall height or design height and thus, compared to the cap-shaped plug couplings known from the prior art, has reduced space requirement. By means of the first and second radially extending spring elements the centrally arranged ball socket is arranged damped twice and/or limitedly moveable in one or more directions within the space. Since by means of the curvilinear shape of the first and second spring elements, as well as due to the design or shaping and orientation of these spring elements compensation movements in different directions are guaranteed on the one hand and/or a constructive adjustable damping of radial and/or axial mechanical loads are realized on the other hand. For this purpose, the first and second spring elements preferably have different designs or shapings, so that the radially outside positioned second spring elements can receive or dampen other mechanical loading conditions than the radially first spring elements arranged within the intermediate ring.

According to a further embodiment, the coupling seat of the plug coupling is a ball socket which has at least one circumferential and non-pierced sidewall. In this context, it is further preferred that the ball socket opposite to its insertion opening is formed open or closed. These design alternatives can be selected freely depending on the required stability of the plug coupling and the weight and space requirements of the plug coupling. While the preferably inserted ball head is no longer visible if arranged in the ball socket formed closed opposite to the insertion opening, an opening opposite to the insertion opening of the ball socket makes it possible to view the inserted ball head. Thus, a certain control function can be realized through an opening opposite the insertion opening because the insertion position of the ball head can be verified with it. Furthermore, it has proven advantageous that a unilaterally closed formed ball socket ensures a protection function against dirt contamination of the mechanical connection between the ball head and the ball socket. In this way it is largely prevented that dust and other dirt can enter into the gap between ball socket and ball head, thereby extending the lifespan of the connection between ball socket and ball head.

It is further preferred that the plug coupling described above is integrally formed and consists of only a single material or a material combination. The integral, i.e. continuous, formation of the plug coupling ensures that this plug coupling has a sufficient stability. This stability is also supported by the appropriate choice of material and also by a possible combination of materials. If the plug coupling is made of a single material, this simplifies the entire production method and also supports the integrity of the plug coupling. It is not necessary to establish reliable connections between different materials due to the use of only a single material. Interface problems between different materials are therefore eliminated. In addition, the simplified production method reduces costs compared to a combination of different materials in the plug coupling. Moreover, according to another embodiment, the plug coupling is also made of different materials. This includes, inter alia, the injecting of individual plastic components of the plug coupling, such as, preferably the first and/or second spring arms, onto the intermediate ring and/or the ball socket. According to a further embodiment, a selection of components of the plug coupling are made of plastic or a different material and subsequently overmolded with a different plastic. It is also preferable to overmold spring elements made of metal with plastic and/or to mold them directly into the construction of the plug coupling or to mold them there onto.

The first and/or second spring elements of the annular plug coupling may be formed as a wavy or U-shaped extending web extending either fully or at least partially in the direction of a radial plane and/or an axial plane and/or an intermediate plane between radial and axial plane of the plug coupling.

The wavy or U-shaped form of the webs used as first and/or second spring elements first ensures a resilient or elastic extension or shortening of the respective web in its longitudinal direction. Additionally, the webs are formed ribbon or strap-like or two-dimensional, so that they have a width which exceeds the thickness of the web. When such a web is loaded in the thickness direction, then a resilient compensating movement is possible. When loading the web in the width direction, the web shows a stronger resistance to deflection as compared to the loading in the thickness direction. Therefore, a direction-dependent damping behavior or tolerance compensation behavior is adjustable by means of the configuration of the first and second spring elements as web and their specific orientation within the plug coupling. For example, if a web-shaped spring element extends in the direction of an axial plane of the plug coupling, then vibration loads or a tolerance compensation in the radial direction are possible, whereas a deflection of the ball socket is limited in the axial direction. If the spring elements extend in the direction of a radial plane, then radial loads and tolerances can be compensated due to the wavy arrangement of the web-shaped spring elements. At the same time, also a compensation of axial loads and tolerances is preferably ensured due to the length of the spring elements. In order to purposefully set further damping situations, all or a selection of the first and second spring elements extend in the direction of an intermediate plane between radial and axial plane. According to a further embodiment, all or a selection of the first and/or second spring elements are arranged twisted around their radial course of direction. On this basis, the first and/or second spring elements extend at least partly toward the axial and/or radial and/or the intermediate plane with respect to their course of direction. This includes, inter alia, that a first spring element is fastened at the ball socket in the direction of the radial plane and is connected with the intermediate ring in the direction of an intermediate plane or the axial plane.

To a further setting of the spring behavior of the spring elements, the first and second spring elements are formed leaf-spring-like with a width-thickness ratio>1, preferably at least 2 or at least 2.5 or at least 4.

According to a further embodiment, the intermediate ring is divided or separated into a plurality of segments that are each connected to at least one first spring element. While the intermediate ring stabilizes in its preferred closed or continuous arrangement the annular plug coupling, the segments of the intermediate ring provide an additional flexibility of the plug coupling. This flexibility is preferably used for receiving or compensating mechanical stresses and/or the adaptation of the plug coupling to existing tolerances at the connection of the first and second component by means of the annular plug coupling. By means of the plurality of segments forming the intermediate ring, sub-areas of the intermediate ring, thus one or more segments, can more easily deflect in a particular load direction as would be possible by a complete intermediate ring. This opens the possibility to give the plug coupling further elastic flexibility in its overall construction at consistent characteristics of the material of the plug coupling.

According to a further embodiment, the second spring elements of the annular plug coupling are formed U-shaped, so that a locking leg of the U-shaped spring element is spaced radially outward from the intermediate ring. Preferably, the legs of the U-shaped spring element extend in the axial direction of the plug coupling. Based on the radial distance between the one leg of the U-shaped second spring element and the intermediate ring, the second spring elements ensure compensating movements upon mechanical loads or upcoming tolerances in the radial plane of the plug coupling. Furthermore, these U-shaped formed second spring elements facilitate the inserting and preferably snapping-in of the annular coupling into the component opening. Since the second spring elements have locking legs lying radially outside, the annular plug coupling must be pressed or snapped into a component opening, without that any complicated or structurally adapted socket or seat for the plug coupling must be formed in the first component.

By means of the plug coupling that is pressed in axial direction into the component opening, the second spring elements are pressed radially inwardly and snap into place in the component opening by means of detents or snap-in noses. Preferably, these detents of the second spring element form an undercut in the axial direction of the plug coupling, so that the first component can be held at the annular plug coupling between the detent and a counter bearing provided at the annular plug coupling. This counter bearing is adapted to the undercut formed by the detent. While the first component or the annular plug coupling is at least supported in axial direction by means of the counter-bearing at the first component, the plurality of the radial resiliently formed second spring elements realizes a firm, preferably a centered, arrangement of the plug coupling within the component opening. Once the annular plug coupling is fastened in the component opening, a ball head can be detachably connected with the plug coupling. Preferably, this ball head is connected to a second component, so that a detachable or releasable connection between a first and a second component can be established by means of the ball head and the annular plug coupling.

This connection method of the first and second component can therefore be summarized as follows: providing the first component with the component opening, fastening the annular plug coupling in the component opening of the first component, providing the second component with a bolt having a ball head and snapping-in of the ball head of the bolt into the annular plug coupling. Alternatively to this, it may also be preferred to first lock the bolt with ball head that is connected to the second component in the plug coupling or to connect it with it. Subsequently, the second component with bolt and plug coupling is then moved to the opening in the first component, and there the plug coupling is fastened in the opening, preferably locked.

The present document also discloses a production method for the above described plug coupling. This production method comprises the following steps: providing an injection mold having the complementary shape of the annular plug coupling, injection molding of the plug coupling and demolding of the plug coupling from the injection mold.

4. BRIEF DESCRIPTION OF THE DRAWINGS

Some preferred embodiments of the present disclosure will be explained in more detail with reference to the accompanying drawings. It shows.

5. DETAILED DESCRIPTION

Figure 1:
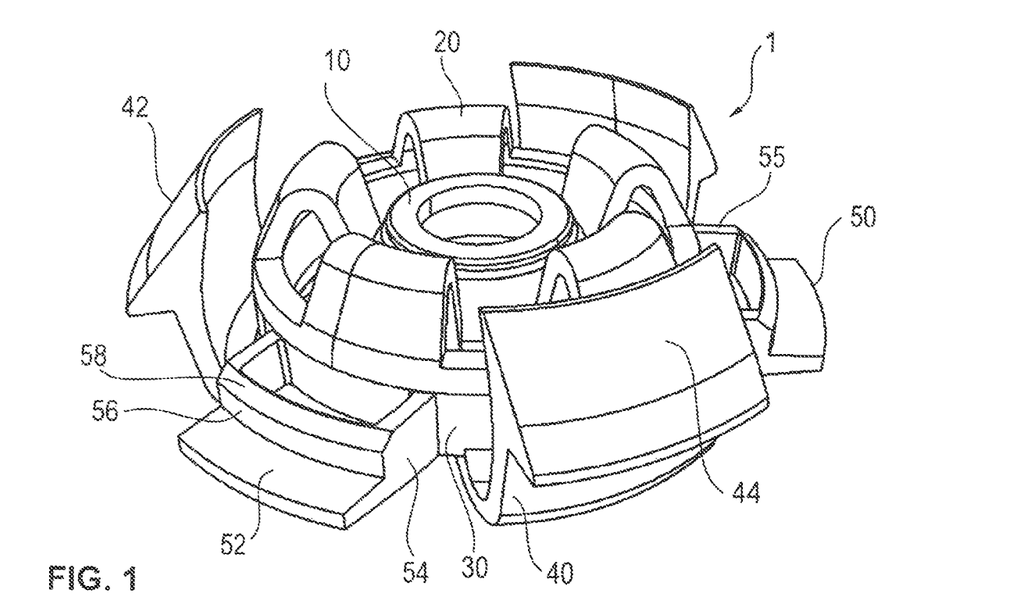
FIG. 1 a perspective view of an embodiment of the present disclosure.
Figure 2:
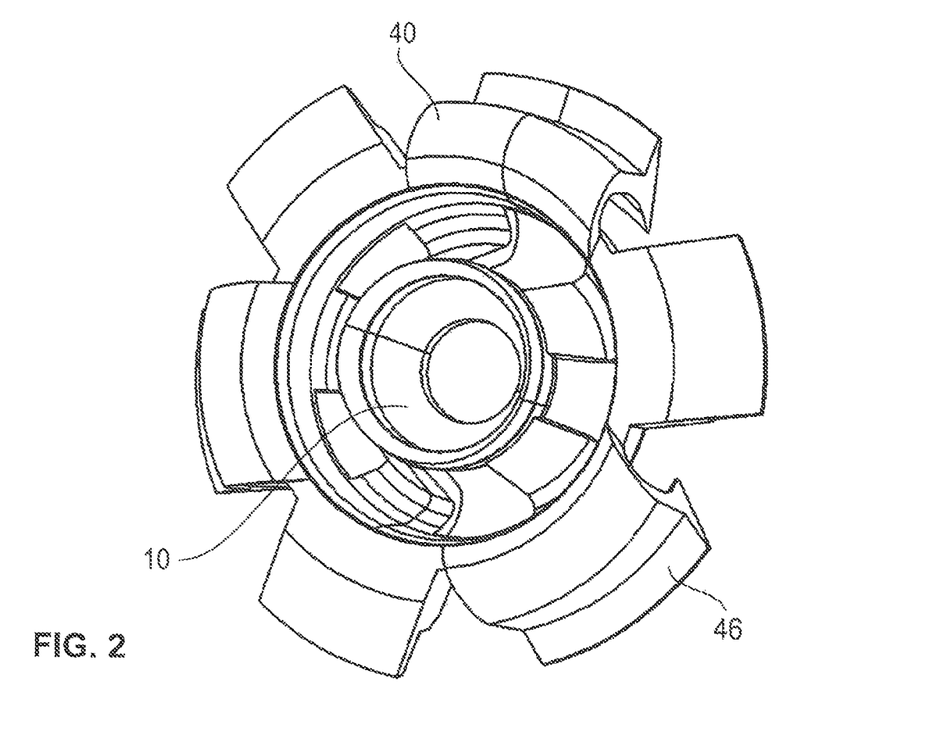
FIG. 2 another perspective view of an embodiment according to FIG. 1.
Figure 3:
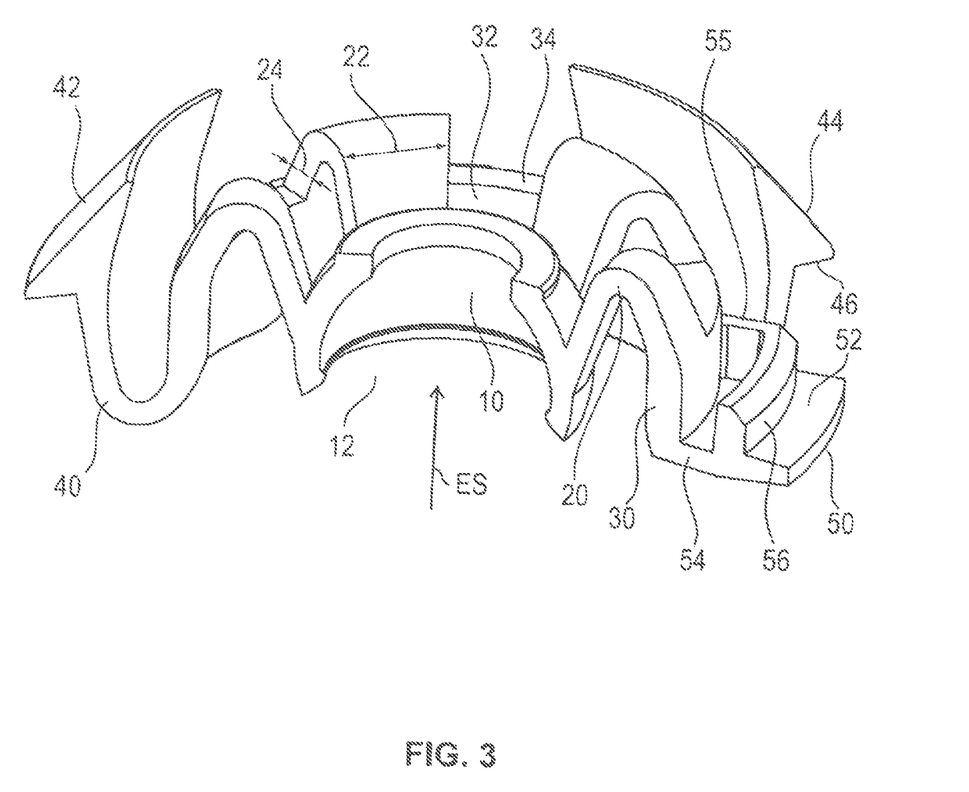
FIG. 3 a partially perspective sectional view of an embodiment according to FIG. 1, FIG. 4 a partial sectional view of the installed annular plug coupling according to an embodiment in connection with a ball bolt or stud, FIG. 5A a partial perspective sectional view of a further embodiment of the present disclosure, FIG. 5B a partial perspective sectional view of another embodiment of the present disclosure, FIG. 6 a perspective view of the annular plug coupling according to another embodiment installed in a component opening, FIG. 7 a partial perspective sectional view of the annular plug coupling according to a further embodiment installed in a component opening, FIG. 8 a flow diagram of an embodiment of a connection method, and FIG. 9 a flow diagram of an embodiment of a production method of the annular plug coupling.

FIGS. 1 and 2 show an embodiment of an inventive annular plug coupling 1 in a perspective view, partly from above (FIG. 1) and from below (FIG. 2). The same annular plug coupling 1 is shown in FIG. 3 as a perspective partial sectional view.

Figure 4:
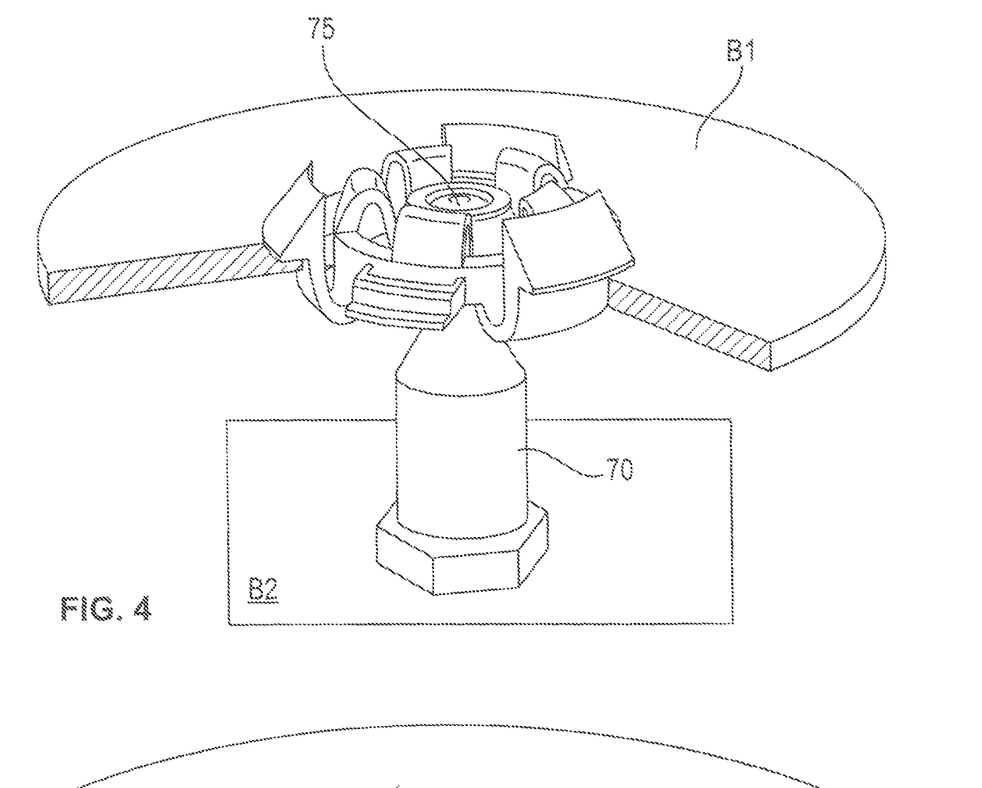

The annular plug coupling comprises a centrally arranged ball socket 10 as a coupling seat or coupler pocket for receiving a coupling head, in particular a ball stud or ball bolt 70 having a ball head 75, a second component, or generally a ball bolt 70 (see FIG. 4). In this context central means an arrangement of the ball socket 10 within an intermediate ring 30, which is explained in more detail below, wherein this arrangement is preferably realized centrally or eccentrically in the intermediate ring. Due to the adapted shape of the ball socket 10 a releasable snap connection can be produced with the ball head 75 of the ball stud 70 by means of the ball socket 10. Since the annular plug coupling 1 is fastened in a component opening O of a first component B (FIG. 4), a connection between the first and second component can be produced via the connection between ball socket 10 and ball head 75.

Despite the releasable snap connection between the ball socket 10 and the ball head 75 the ball socket 10 permits a movement of the ball stud 70 in a given solid angle. In addition, and alternatively to the connection between ball socket 10 and ball head 75 other snap connections can be used, in which a functional head can be fastened releasably in a complementarily formed coupling seat.

The ball socket 10 is preferably centrically arranged in the intermediate ring 30. Preferably, the intermediate ring 30 has an axial expansion of the order of a height of the ball socket 10. The intermediate ring 30 is connected radially inwards with the ball socket 10 by means of a plurality of first spring elements 20. The first spring elements 20 are fastened to the radial exterior of the ball socket 10. According to different embodiments of the present disclosure, the first spring elements 20 are fastened to the radial inner side 32 of the intermediate ring 30 or on one of its axial end faces 34 (see FIGS. 3 and 5). According to a further embodiment of the annular plug coupling 1 shown in the FIGS. 1 to 3, the first spring elements 20 are attached to the radial exterior or outside of the ball socket 10 and to the axial end face 34 of the intermediate ring 30. Therebetween, the first spring elements 20 have a curvilinear, preferably a wave-shaped or U-shaped form. An axial extension of the ball socket 10 and the intermediate ring 30 is preferably restricted to a minimum in order to achieve the advantages of a low installation height. The preferably U-shaped formed first spring elements 20 therefore abut or engage adjacent to the entrance 12 of the ball socket 10 and at the end face 34 of the intermediate ring 30 which is facing away from the entrance. Due to this construction, the plug coupling 1 has a flat and space saving annular structure in axial direction which exceeds the axial size of the ball socket 10 preferably only slightly or not at all.

Figure 5A:
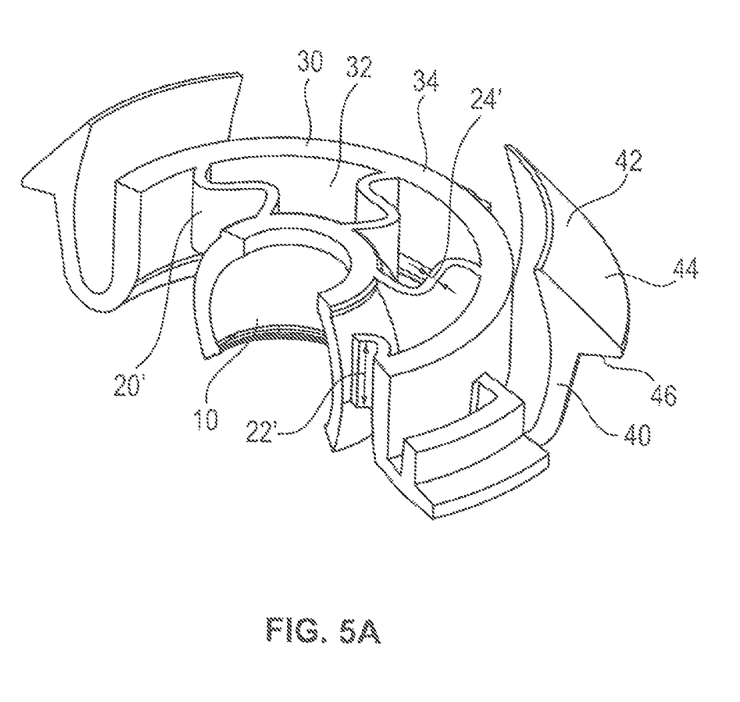
Figure 5B:
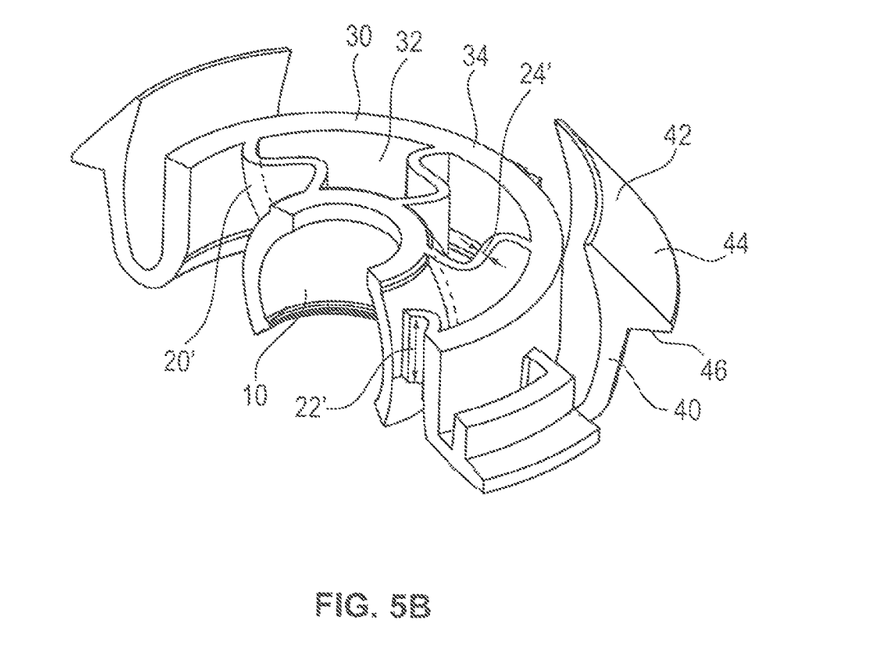

As can be seen with reference to FIG. 5, it is also preferred to form the first spring elements 20' wavy. According to the embodiment shown in FIG. 5 the first spring elements 20' extend in the direction of an axial plane of the plug coupling 1. According to the arrangement of the first spring elements 20 in the FIGS. 1 to 3 the first spring elements 20 extend in the direction of a radial plane. It is clear that the first spring elements 20 of the FIGS. 1 to 3 may also be formed wavy.

It is further preferred that the first 20; 20' and/or second spring elements 40 (see below) extend in the direction of an inclined intermediate plane between the axial plane and the radial plane. Furthermore, it is preferred that at least the first spring elements 20, 20' are constructed twisted in their longitudinal direction. In this way, for example, the radially inner end of the first spring element 20' begins in an axial plane, while it ends in the direction of an intermediate plane between the axial plane and the radial plane. This is illustrated in FIG. 5B. In this context, it is also preferred to combine several first spring elements 20, 20' with each other that extend in the direction of an axial plane, and/or in the direction of a radial plane and/or in the direction of an inclined intermediate plane between the radial plane and the axial plane. Of course this combination of different first spring elements 20; 20' can also have at least one further first spring element which is twisted along its longitudinal axis, so that it can extend in its course in the direction of different planes, for example in the direction of the axial plane, the radial plane and/or an inclined plane arranged therebetween. With this particular configuration of the plug coupling 1 specifically targeted adaptions to the required damping behavior and/or tolerance compensation behavior can be realized depending on the case of the application of the plug coupling 1.

The first spring elements 20, 20' preferably have a width 22, 22', and a thickness 24, 24'. The width 22, 22' is further preferably larger than the thickness 24, 24', so that the first spring elements are formed ribbon-like or strap-like. In order to achieve sufficient stability while maintaining direction-specific flexibility at the same time, the width-to-thickness ratio is greater than 1, preferably at least 2 or at least 2.5 or at least 4. Due to the given width-to-thickness ratios, it is also conceivable to provide the first spring elements 20; 20' in the configuration of a resilient metal strip. In relation to the course of the first spring element 20, 20' in the direction of the axial or radial plane of the plug coupling 1, the width 22' of the first spring element 20 is therefore arranged in parallel to an axial plane and the width 22 of the first spring element 20 is arranged in parallel to a radial plane. Since the first spring elements 20, 20' are formed curvilinear, wavy or U-shaped between the ball socket 10 and the intermediate ring 30, they guarantee a limited movability of the ball socket 10 in radial direction. The movability of the ball socket 10 which is made possible by the radial elongation and shortening of the first spring elements 20, 20', serves for the vibration damping, the compensation of tolerances and/ or the compensation of movements between the first B1 and the second component B2. If the first spring elements 20, 20' extend in a radial plane (see FIGS. 1-3), preferably an axial vibration, tolerance or motion compensation between the components B1, B2 is also provided.

In the arrangement of the first spring elements 20 in an axial plane (see FIG. 5) the width 22' extends in the axial direction of the plug coupling 1. When loading the ball socket 10 in FIG. 5 in the axial direction, the first spring elements 20' are deflected only slightly or negligibly because the width 22' is arranged parallel to the loading direction. In this case, radial compensation or damping motions of the plug coupling are preferably only possible by means of a plurality of second spring elements 40 extending radially outwardly from the intermediate ring 30.

It is also preferred to mix or alternate the first spring elements 20', 20 shown in the FIGS. 3 and 5, in the construction of only one plug coupling 1, in order to achieve an adapted damping behavior of the plug coupling 1.

According to another embodiment of the present disclosure, the thickness 24, 24' and/or the width 22, 22' of the first spring elements 20, 20' is adapted to set a certain flexibility of the first spring elements 20, 20'. Thus, and for example in the plug coupling 1 of FIG. 3, a smaller width 22 and/or a reduced thickness 24 of the first spring elements 20 facilitates an increased movability of the ball socket 10 in axial and radial direction. Furthermore, a small width 22' in the plug coupling 1 of FIG. 5 achieves a higher radial movability. In addition, it is preferred to increase the length of the first spring elements 20, 20' in order to improve or to reduce the movability of the ball socket 10, in order to increase the stability or rigidity of the plug coupling 1. The length of a first spring element 20, 20' stands for the distance between the ball socket 10 and intermediate ring 30 measured along the surface of the first spring element 20, 20'.

According to another not shown embodiment, the intermediate ring 30 is not formed continuously, but divided or separated into a plurality of segments. Preferably, each segment is connected to at least one first spring element 20, preferably two spring elements 20. Due to this construction especially the flexibility of the plug coupling 1 in axial direction is increased.

Figure 6:
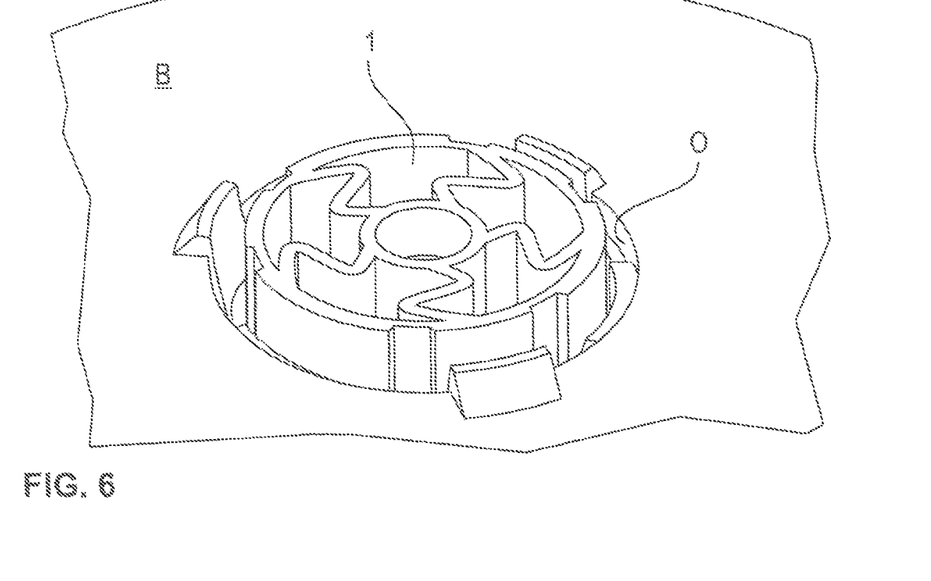
Figure 7:
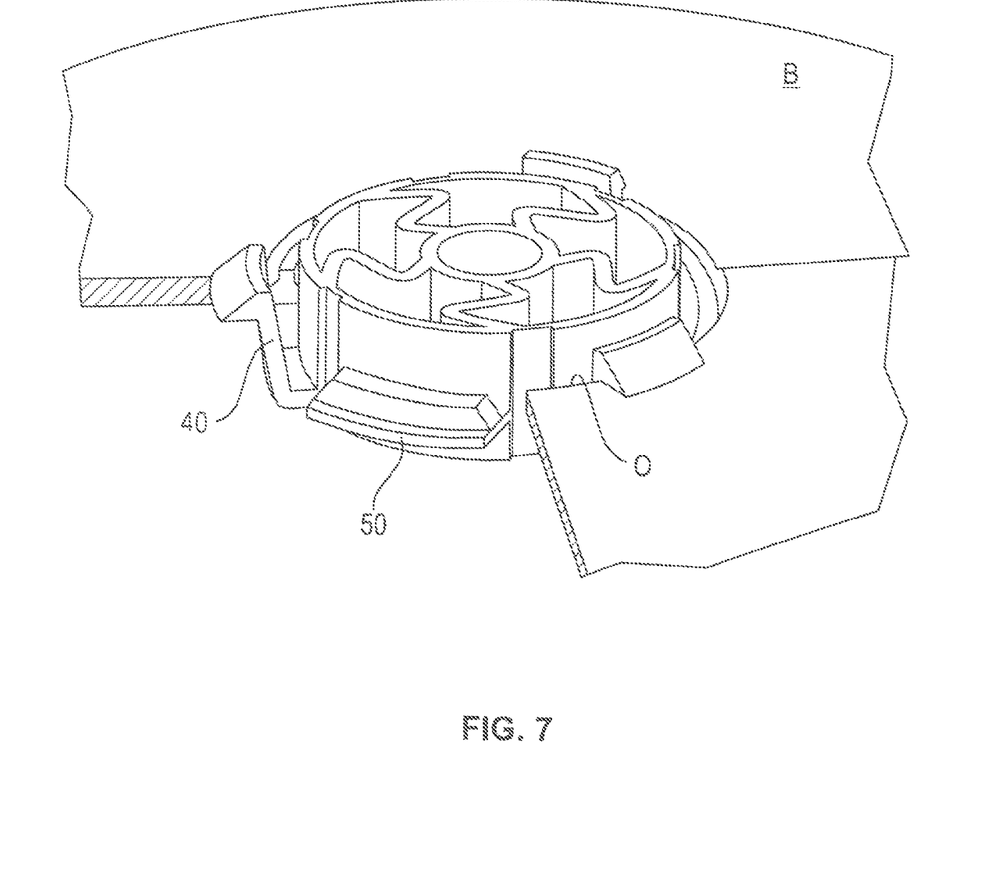
Figure 8:
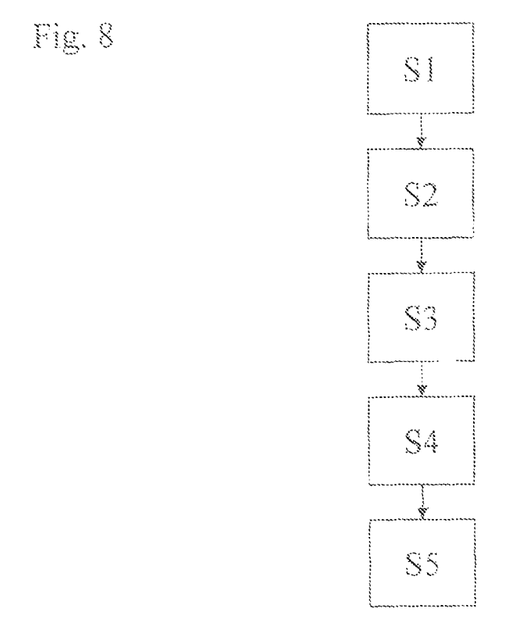

As can be seen based on FIGS. 4, 6, 7, the first component B1 is initially provided (S1) and then the opening O (step S2) is created therein, preferably drilled, sawed, cut, laser cut, punched, or the like. Thereafter, the annular plug coupling 1 is releasably fastened, preferably locked, in the opening O (step S3). For fastening in the opening O, the plug coupling 1 has a plurality of second spring elements 40 which extend radially outwardly from the intermediate ring 30. This fastening process can be realized regardless of whether a ball head 75 is already inserted into the ball socket 10 or not.

According to a further embodiment of the present disclosure, the second spring elements 40 also have a curvilinear shape. This curvilinear shape is U-shaped, wavy or formed similarly. The second spring elements 40 therefore have an adjustable flexibility under mechanical loads so that the second spring elements 40 can also realize, similar to the first spring elements 20, a tolerance compensation, a vibration damping and/or a compensation of movements between the first B1 and the second component B2.

As can be seen based on FIGS. 4 and 7, the second spring elements 40 lock the annular plug coupling 1 within the opening O of the first component B. For this purpose, the plurality of second spring elements 40 is arranged uniformly distributed around the circumference of the intermediate ring 30. Preferably, at least two second spring elements 40, preferably three or more, are provided which are formed U-shaped according to the embodiments of FIGS. 1 to 7. In addition, each second spring element 40 has a detent 42 at one leg of the U-shaped second spring element 40. D includes an inserting chamfer 44 and a holding surface 46. Since the second spring elements 40 are arranged radially resilient, the inserting chamfer 44 of the detent 42 presses the second spring element 40 radially inwardly upon inserting (step S3) of the plug coupling 1 into the opening O so that at the end of the inserting chamfer 44, the holding surface 46 can snap-in at a surface of the first component B. Thereafter, the holding surface 42 forms an undercut contrary to an insertion direction ES of the plug coupling 1 in the opening O.

It shall be understood that the second spring elements 40 can be, in the same manner as the first spring elements 20, adapted in their width and thickness and in their course, in order to achieve the desired flexibility of the second spring elements, and thus of the plug coupling 1, for the case of application. In doing so, it must only be ensured that the fastening means at the radially outer end of the second spring elements 40 reliably hold the plug coupling 1 in the opening O of the first component B.

In order to not push the plug coupling 1 upon inserting in the opening O of the component B again out of the opening O, a counter-bearing 50 is preferably provided. The counter-bearing 50 extends radially outwardly from the intermediate ring 30 and provides the counter surface 52. The counter surface 52 that may also be formed by one or a plurality of hold points (not shown) is arranged parallel to the hold surface 46. A distance between hold surface 46 and counter-bearing 52 is preferably smaller or equal to a thickness of the component B1. In this way it is ensured that the component B1 is held without play between the hold surface 46 and the counter bearing 52. This holding is preferably supported by the fact that the counter-bearing 50 is arranged resilient or deflectable in the axial direction of the plug coupling 1. For this purpose, a thickness of a web 54 is set in such a way that the counter-bearing 50 has, at sufficient stability, also a sufficient flexibility. The web 54 fastens the counter bearing 50 at the intermediate ring 30. According to a further embodiment of the present disclosure, the web 54 is formed straight in the radial extension and is molded on the radial outer side of the intermediate ring 30 (see FIGS. 1, 3, 5, 7). Also preferably, the web 54 is formed curvilinear (not shown).

The counter-bearing 50 also provides a radial hold surface 56 with inserting chamfer 58. The radial hold surface 56 is preferably supported at the radial inner wall of the opening O after the insertion of the plug coupling 1 into the opening O. By doing so, the plug coupling 1 is stabilized in the radial direction in the opening O and a radial offset of the plug coupling 1 upon radial load of the second spring elements 40 is reduced. Preferably, the radial hold surface 56 is reinforced in radial direction by an additional stiffening rib 55 extending between the radial hold surface 56 and the intermediate ring 30.

From the arrangement of the first 20 and second spring elements 40 results a reliable and stable arrangement of the ball socket 10 in the opening of the component B1. The construction of the plug coupling 1 guarantees a low overall height of the plug coupling 1 in the axial direction, an advantageous damping behavior of mechanical vibrations and an efficient tolerance compensation between the first and second component. If the ball head 75 of the ball bolt 70 (step S4) that is connected with the second component snaps (step S5) into place in the ball socket 10, then radial and/or axial movements of the ball socket 10 are possible without a loss of stability of the plug coupling 1. It should be emphasized that the stability and flexibility of the plug coupling 1 is not only specifically adjustable by means of a suitable choice of materials for the plug coupling 1 but especially by means of the structural design of the plug coupling 1.

The above described embodiments of the plug coupling 1 are preferably formed integrally. According to a first embodiment the plug coupling 1 consists of only one material. It is also preferred to produce the plug coupling 1 from a material combination with at least two different materials. In this context, material combination means providing different components of the plug coupling 1 from different materials. Provided that the plug coupling consists of only one material, its production method is thereby simplified, while at the same time an adequate stability and lifetime of the plug coupling 1 can be ensured. By means of the combination of multiple materials in the plug coupling 1, a targeted adaptation to different connection relations is conceivable. These connection relations include e.g. a special damping behavior which is to be realized by the plug coupling 1. Therefore, in this context, it is preferred to produce the first 20 and second spring elements 40 from the same material or from different materials. If the plug coupling 1 consists of a single material, it is made of one piece of material, for example it is produced by using the injection molding process described below.

While the ball socket 10 and the intermediate ring 30 are made or can be made of the same material or different materials, it is preferred, according to a further embodiment to make the first spring elements 20 of a different material, and the second spring elements 40 of the same or another different material, as compared to the ball socket and/or to the intermediate ring. In this way, different properties in the tolerance compensation or the damping behavior of the plug coupling in general and the first 20 and the second spring elements 40 are purposefully adjustable.

The following materials are used individually or in combination with other mentioned materials for the production of the plug coupling 1: elastomers, thermoplastic elastomers, silicones, POM, PP (polypropylene), PA (polyamide) and other suitable engineering plastics.

According to another embodiment of the present disclosure, the plastics to be used for the production of the plug coupling 1 are generally defined by their Shore hardness and/or modulus of elasticity depending on the required stability of the plug coupling 1. Therefore, materials are preferred for producing the plug coupling 1 which have a Shore hardness in the range of 50A to 70D and more preferably in the range of 50A-52D. With regard to the modulus of elasticity, it is alone or in combination with the above-mentioned Shore hardness preferred if the material of the plug coupling 1 preferably has a modulus of elasticity of <5000 MPa and preferably of <3000 MPa. In this context it should be emphasized that for the production of the plug coupling 1 materials are also used which can be easily cleaned and also are approved for use in the food processing industry and the medical technology sector and similar areas or fields.

Due to the wide range of materials and the variety of constructive design possibilities of the plug coupling 1, the plug coupling 1 can be used in combination with all kinds of oscillation and vibration loaded machine parts. These are preferably from the field of construction of motor vehicles, rail vehicles, aircrafts and water vehicles. Because of their entirely closed central coupler pocket 10 and the segmented and openly arranged first and second spring elements 20, 20', 40 the plug coupling 1 and the connection thus produced can simply and easily be cleaned. For this reason, the plug coupling 1 can especially be used for attaching components with a vibration-damping effect into machines of the food industry and the pharmaceutical industry and medical technology.

Figure 9:
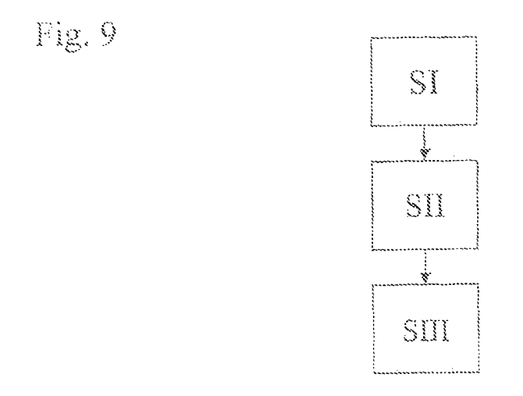

The annular plug coupling may be manufactured using an injection molding process. For this purpose, in a first step an injection mold is provided (step SI). The injection mold defines a cavity having the complementary shape to the annular plug coupling 1. In the subsequent step SII the annular plug coupling is injection molded in this mold. For this purpose elastomers or similar stable and easily processed materials are used. In the following step SIII the produced plug coupling is demolded from the injection mold, and, if necessary, post-processed.

Certain embodiments or components or features of components have been noted herein as being "preferred" and such indications are to be understood as relating to a preference of the applicant at the time this application was filed. Such embodiments, components or features noted as being "preferred" are not required for implementation of the inventions disclosed herein unless otherwise indicated as being required, or unless specifically included within the claims that follow.

The invention claimed is:

1. An annular plug coupling that can be fastened in a component opening of a first component and which has the following features:
   a. a centrally arranged coupling seat by means of which a coupling head of a second component can be detachably connected, and
   b. an intermediate ring with
      b.1 a plurality of curvilinear and radially inwardly extending first spring elements which are connected with the coupling seat, and
      b.2 a plurality of curvilinear and radially outwardly extending second spring elements, that have a locking connection at a radially outward end, so that the plug coupling is lockable in the component opening, in which
   c. the second spring element has a detent which forms an undercut in the axial direction of the annular plug coupling, so that the first component is supported between the detent and a counter-bearing.

2. The annular plug coupling according to claim 1, the coupling seat of which is a ball socket that has at least a circumferential and non-pierced sidewall.

3. The annular plug coupling according to claim 2, in which the first and second spring elements have the form of a leaf-spring which has a width-thickness ratio of >1.

4. The annular plug coupling according to claim 2, which is integrally formed and consists of only one material or one material combination.

5. The annular plug coupling according to claim 2, in which the intermediate ring comprises a plurality of segments which are each connected with at least one first spring element.

6. The annular plug coupling according to claim 5, that also includes a counter-bearing that comprises a web protruding radially outwardly from the intermediate ring, wherein the web has an axial and a radial abutment surface for the second component.

7. The annular plug coupling according to claim 2, in which the second spring elements are U-shaped, so that a locking leg of the U-shaped spring element is spaced radially outwardly from the intermediate ring.

8. The annular plug coupling according to claim 1, which is integrally formed and consists of only one material or one material combination.

9. The annular plug coupling according to claim 8, in which the first and/or second spring elements are formed as a wavy or U-shaped extending webs extending respectively completely or at least partly in direction of a radial plane and/or an axial plane and/or an intermediate plane between the radial plane and axial plane of the annular plug coupling.

10. The annular plug coupling according to claim 8, in which the intermediate ring comprises a plurality of segments which are each connected with at least one first spring element.

11. The annular plug coupling according to claim 1, in which the first and/or second spring elements are formed as a wavy or U-shaped extending web extending respectively completely or at least partly in the direction of a radial plane and/or an axial plane and/or an intermediate plane between radial and axial plane of the annular plug coupling.

12. The annular plug coupling according to claim 1, in which the intermediate ring comprises a plurality of segments which are each connected with at least one first spring element.

13. The annular plug coupling according to claim 12, that also includes a counter-bearing that comprises a web protruding radially outwardly from the intermediate ring, wherein the web has an axial and a radial abutment surface for the second component.

14. The annular plug coupling according to claim 1, in which the second spring elements are U-shaped, so that a locking leg of the U-shaped spring element is spaced radially outwardly from the intermediate ring.

15. A first component and a second component which are connected with each other by means of the annular plug coupling according to claim 1, wherein the first component has a component opening with the annular plug coupling and the second component has a bolt with a ball head that is locked in the annular plug coupling.

16. Connecting method for a first and a second component, comprising the steps of:
providing the first component with a component opening,
fastening the annular plug coupling, in particular according to claim 1, within the component opening of the first component,
providing a second component with a bolt with a ball head, and
locking the ball head of the bolt in the annular plug coupling or
first, locking of the bolt with ball head connected to the second component in the plug coupling and subsequently
moving the second component with bolt and plug coupling to the opening in the first component, and
fastening the plug coupling within the opening.

17. Production method for the annular plug coupling according to claim 1, comprising the following steps:
providing an injection mold having the complementary shape of the annular plug coupling,
injection molding of the plug coupling and
demolding of the plug coupling from the injection mold.

* * * * *